(12) United States Patent
Ahn et al.

(10) Patent No.: US 12,409,929 B2
(45) Date of Patent: Sep. 9, 2025

(54) AIRCRAFT PITCH CONTROL SYSTEM WITH ELECTRONICALLY GEARED ELEVATOR

(71) Applicant: BOMBARDIER INC., Dorval (CA)

(72) Inventors: Thomas Ahn, Pincourt (CA); Clinton Eric Tanner, Senneville (CA); Thomas Nelson, Toronto (CA); Scott Black, Laval (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 17/549,076

(22) Filed: Dec. 13, 2021

(65) Prior Publication Data

US 2022/0097827 A1 Mar. 31, 2022

Related U.S. Application Data

(63) Continuation of application No. 16/095,831, filed as application No. PCT/IB2017/052257 on Apr. 19, 2017, now Pat. No. 11,230,368.

(60) Provisional application No. 62/326,971, filed on Apr. 25, 2016.

(51) Int. Cl.
*B64C 13/50* (2006.01)
*G05D 1/00* (2006.01)

(52) U.S. Cl.
CPC ............ *B64C 13/50* (2013.01); *B64C 13/503* (2013.01); *G05D 1/0816* (2013.01)

(58) Field of Classification Search
CPC ......... B64C 9/12; B64C 13/50; B64C 13/503; B64C 9/04; B64C 9/10; G05D 1/055–0083; G05D 1/06–0688; G05D 1/08–085

See application file for complete search history.

(56) References Cited

U.S. PATENT DOCUMENTS

| | | | | |
|---|---|---|---|---|
| 2,563,757 A | * | 8/1951 | Thorp | B64C 13/00 244/82 |
| 2,577,439 A | * | 12/1951 | Wendt | B64C 13/00 244/82 |
| 2,980,364 A | * | 4/1961 | Hohenemser | B64C 27/04 244/17.11 |
| 3,207,458 A | | 9/1965 | Kean | |
| 3,949,958 A | | 4/1976 | Richter | |
| 4,744,532 A | | 5/1988 | Ziegler et al. | |

(Continued)

FOREIGN PATENT DOCUMENTS

| | | | | |
|---|---|---|---|---|
| EP | 3929073 A1 | * | 12/2021 | ........... B64C 13/042 |
| WO | WO-2015114586 A1 | * | 8/2015 | ........... B64C 13/341 |

OTHER PUBLICATIONS

Ruhlin et al., Experimental and Analytical Transonic Flutter Characteristics of a Geared-Elevator Configuration, NASA Technical Paper 1666, Jun. 1980, USA.

(Continued)

*Primary Examiner* — Joshua J Michener
*Assistant Examiner* — Ryan Andrew Yankey
(74) *Attorney, Agent, or Firm* — Norton Rose Fulbright Canada LLP

(57) ABSTRACT

Aircraft pitch control systems and methods are disclosed. In one exemplary embodiment, an aircraft pitch control system comprises a movable horizontal stabilizer and an elevator movably coupled to the horizontal stabilizer. The elevator is electronically geared to the horizontal stabilizer.

8 Claims, 5 Drawing Sheets

(56) References Cited

U.S. PATENT DOCUMENTS

| | | | | |
|---|---|---|---|---|
| 4,825,375 | A | * | 4/1989 | Nadkarni .............. G05D 1/0607 701/3 |
| 4,863,120 | A | * | 9/1989 | Zweifel ................ G05D 1/0623 244/175 |
| 5,023,791 | A | | 6/1991 | Herzberg et al. |
| 5,913,492 | A | * | 6/1999 | Durandeau ................ B64C 9/10 244/76 A |
| 6,257,528 | B1 | * | 7/2001 | Brislawn .............. B63H 25/381 244/211 |
| 6,386,485 | B1 | * | 5/2002 | Sjoquist ................. B64C 13/50 701/4 |
| 7,281,683 | B2 | | 10/2007 | Delaplace et al. |
| 7,963,485 | B2 | | 6/2011 | Koneczny |
| 8,014,910 | B2 | | 9/2011 | Mathieu et al. |
| 8,876,063 | B2 | * | 11/2014 | Sheahan, Jr. ............. B64C 9/10 244/99.14 |
| 10,816,998 | B2 | * | 10/2020 | Lee ......................... B64C 13/16 |
| 11,767,102 | B2 | * | 9/2023 | Claffy ................... B64C 13/503 701/4 |
| 2005/0178899 | A1 | | 8/2005 | Boe et al. |
| 2009/0146003 | A1 | * | 6/2009 | Sheahan, Jr. ............. B64C 9/10 244/99.14 |
| 2010/0042271 | A1 | | 2/2010 | Holzhausen |
| 2011/0251739 | A1 | | 10/2011 | Tomas et al. |
| 2016/0122000 | A1 | * | 5/2016 | Mahmulyin ......... G05D 1/0066 244/230 |
| 2018/0022443 | A1 | | 1/2018 | Nakagawa et al. |
| 2018/0037313 | A1 | | 2/2018 | Harden et al. |

OTHER PUBLICATIONS

International Searching Authority, PCT International Search Report and Written Opinion dated Aug. 3, 2017 re: International Patent Application No. PCT/IB2017/052257.

* cited by examiner

AIRCRAFT PITCH CONTROL SYSTEM WITH ELECTRONICALLY GEARED ELEVATOR

CROSS-REFERENCE TO RELATED APPLICATION(S)

The present application is a continuation of U.S. patent application Ser. No. 16/095,831 filed on Apr. 19, 2017, which is a national phase application under 35 U.S.C. 371 of international patent application No. PCT/IB2017/052257 filed on Apr. 19, 2017, which claims priority to U.S. provisional patent application No. 62/326,971 filed on Apr. 25, 2016, the entire contents of all of which are hereby incorporated by reference.

TECHNICAL FIELD

The disclosure relates generally to pitch control systems of aircraft, and more particularly to aircraft pitch control systems with electronically geared elevators.

BACKGROUND OF THE ART

The horizontal stabilizer on an aircraft is typically a movable aerodynamic surface located in an aft portion of the aircraft and that is used to provide longitudinal (pitch) stability and control for the aircraft. In order to set the pitch angle of the aircraft, the horizontal stabilizer can be trimmed (actuated) such that it selectively produces positive or negative lift, or is neutral. Conventional horizontal stabilizers can be moved about an axis running parallel to the aircraft lateral axis, so that they can be trimmed over a predetermined angular range. The magnitude and direction of the aerodynamic force (i.e., positive lift or negative lift) that is produced can be varied by varying the incidence angle of the horizontal stabilizer.

A horizontal stabilizer must be sufficiently large to produce the desired aerodynamic effect at various operating conditions (e.g., flap configurations, speeds, etc.) of an aircraft. The size of the horizontal stabilizer of an aircraft affects the amount of drag that it produces during flight and also affects the overall weight of the aircraft.

SUMMARY

In one aspect, the disclosure describes an aircraft pitch control system. The system comprises:
a first actuator configured to actuate a movable stabilizer associated with a pitch of the aircraft;
a second actuator configured to actuate an elevator movably coupled to the stabilizer; and
one or more data processors operatively coupled to the first actuator and to the second actuator; and
machine-readable memory storing instructions executable by the one or more data processors and configured to cause the one or more data processors to:
using data representative of a commanded stabilizer actuation amount and data representative of a gearing relationship between the stabilizer and the elevator, determine a corresponding elevator actuation amount associated with the commanded stabilizer actuation amount; and
generate an output for causing the first actuator to actuate the stabilizer according to the commanded stabilizer actuation amount and for causing the second actuator to actuate the elevator according to the corresponding elevator actuation amount.

The gearing relationship may comprise:
a first portion over a first range of stabilizer actuation amounts in which a first non-zero stabilizer actuation amount requires a corresponding first non-zero elevator actuation amount; and
a second portion over a second range of stabilizer actuation amounts in which a second non-zero stabilizer actuation amount requires no elevator actuation amount.

The second range of stabilizer actuation amounts of the second portion may comprise a neutral position of the stabilizer.

The gearing relationship may comprise a third portion over a third range of stabilizer actuation amounts in which a third non-zero stabilizer actuation amount requires a corresponding second non-zero elevator actuation amount.

The second range of stabilizer actuation amounts may be between the first range of stabilizer actuation amounts and the third range of stabilizer actuation amounts.

In some embodiments, at least one of the first portion and third portion of the gearing relationship is linear.

In some embodiments, each of the first portion and third portion of the gearing relationship is linear.

The gearing relationship may comprise a dead zone in which stabilizer actuation requires no elevator actuation. The dead zone may include a neutral position of the stabilizer.

The gearing relationship may comprise a first portion over a first range of stabilizer actuation amounts and a second portion over a second range of stabilizer actuation amounts where the first portion and the second portion have different slopes.

The gearing relationship may comprise a linear portion.
The gearing relationship may comprise a non-linear portion.

The instructions may be configured to cause the one or more data processors to reset a neutral position of the elevator to the corresponding elevator actuation amount.

The instructions may be configured to cause the one or more data processors to change the gearing relationship based on one or more operating parameters of the aircraft.

In another aspect, the disclosure describes an aircraft pitch control system comprising:
a movable horizontal stabilizer; and
an elevator movably coupled to the horizontal stabilizer, the elevator being electronically geared to the horizontal stabilizer.

The elevator may be electronically geared to the horizontal stabilizer according to a gearing relationship comprising:
a first portion over a first range of stabilizer actuation amounts in which a first non-zero stabilizer actuation amount requires a corresponding first non-zero elevator actuation amount; and
a second portion over a second range of stabilizer actuation amounts in which a second non-zero stabilizer actuation amount requires no elevator actuation amount.

The second range of stabilizer actuation amounts of the second portion may comprise a neutral position of the stabilizer.

The gearing relationship may comprise a third portion over a third range of stabilizer actuation amounts in which a third non-zero stabilizer actuation amount requires a corresponding second non-zero elevator actuation amount.

The second range of stabilizer actuation amounts may be between the first range of stabilizer actuation amounts and the third range of stabilizer actuation amounts.

In some embodiments, at least one of the first portion and third portion of the gearing relationship is linear.

In some embodiments, each of the first portion and third portion of the gearing relationship is linear.

The elevator may be electronically geared to the horizontal stabilizer according to a gearing relationship comprising a dead zone in which stabilizer actuation requires no elevator actuation. The dead zone may include a neutral position of the stabilizer.

The elevator may be electronically geared to the horizontal stabilizer according to a gearing relationship comprising a first portion over a first range of stabilizer actuation amounts and a second portion over a second range of stabilizer actuation amounts where the first portion and the second portion have different slopes.

The gearing relationship may comprise a linear portion.

The gearing relationship may comprise a non-linear portion.

The gearing relationship may be changeable based on one or more operating parameters of the aircraft.

In another aspect, the disclosure describes are aircraft comprising a pitch control system as disclosed herein.

In a further aspect, the disclosure describes a method for controlling the pitch of an aircraft using a movable stabilizer of the aircraft and an elevator movably coupled to the stabilizer. The method comprises:

actuating the stabilizer; and actuating the elevator based on an electronic gearing relationship between the stabilizer and the elevator.

The gearing relationship may comprise:

a first portion over a first range of stabilizer actuation amounts in which a first non-zero stabilizer actuation amount requires a corresponding first non-zero elevator actuation amount; and a second portion over a second range of stabilizer actuation amounts in which a second non-zero stabilizer actuation amount requires no elevator actuation amount.

The second range of stabilizer actuation amounts of the second portion may comprise a neutral position of the stabilizer.

The gearing relationship may comprise a third portion over a third range of stabilizer actuation amounts in which a third non-zero stabilizer actuation amount requires a corresponding second non-zero elevator actuation amount.

The second range of stabilizer actuation amounts may be between the first range of stabilizer actuation amounts and the third range of stabilizer actuation amounts.

In some embodiments, at least one of the first portion and third portion of the gearing relationship is linear.

In some embodiments, each of the first portion and third portion of the gearing relationship is linear.

The gearing relationship may comprise a dead zone in which stabilizer actuation requires no elevator actuation. The dead zone may include a neutral position of the stabilizer.

The gearing relationship may comprise a first portion over a first range of stabilizer actuation amounts and a second portion over a second range of stabilizer actuation amounts where the first portion and the second portion have different slopes.

The gearing relationship may comprise a linear portion.

The gearing relationship may comprise a non-linear portion.

The method may comprise resetting a neutral position of the elevator to an elevator actuation amount attributed to the electronic gearing relationship.

The method may comprise changing the gearing relationship based on one or more operating parameters of the aircraft.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to aircraft pitch control systems with electronically geared elevators. In some embodiments, the use of one or more elevators that are geared to the movement of an associated horizontal stabilizer (i.e., tailplane) may improve the effectiveness of the stabilizer. Accordingly, in some embodiments, the use of a geared elevator may permit the use of a stabilizer of a smaller size and hence reduced weight compared to stabilizers that have non-geared elevators movably coupled thereto.

In some embodiments, the use of electronic gearing may provide flexibility with making changes to an associated gearing relationship compared to mechanical motion transfer means (e.g., gears, linkages) between the stabilizer and the elevator. In some embodiments, the use of electronic gearing may also allow the use of different gearing relationships at different times depending on the operating condition of an aircraft. Such flexibility, may be advantageous for example during the development of an aircraft and during flight testing where adjustments to the gearing relationship may be required. The use of electronic gearing may provide operational advantages such as permitting the use of complex gearing relationships that would otherwise be difficult to achieve using mechanical motion transfer means.

Aspects of various embodiments are described through reference to the drawings.

Figure 1:
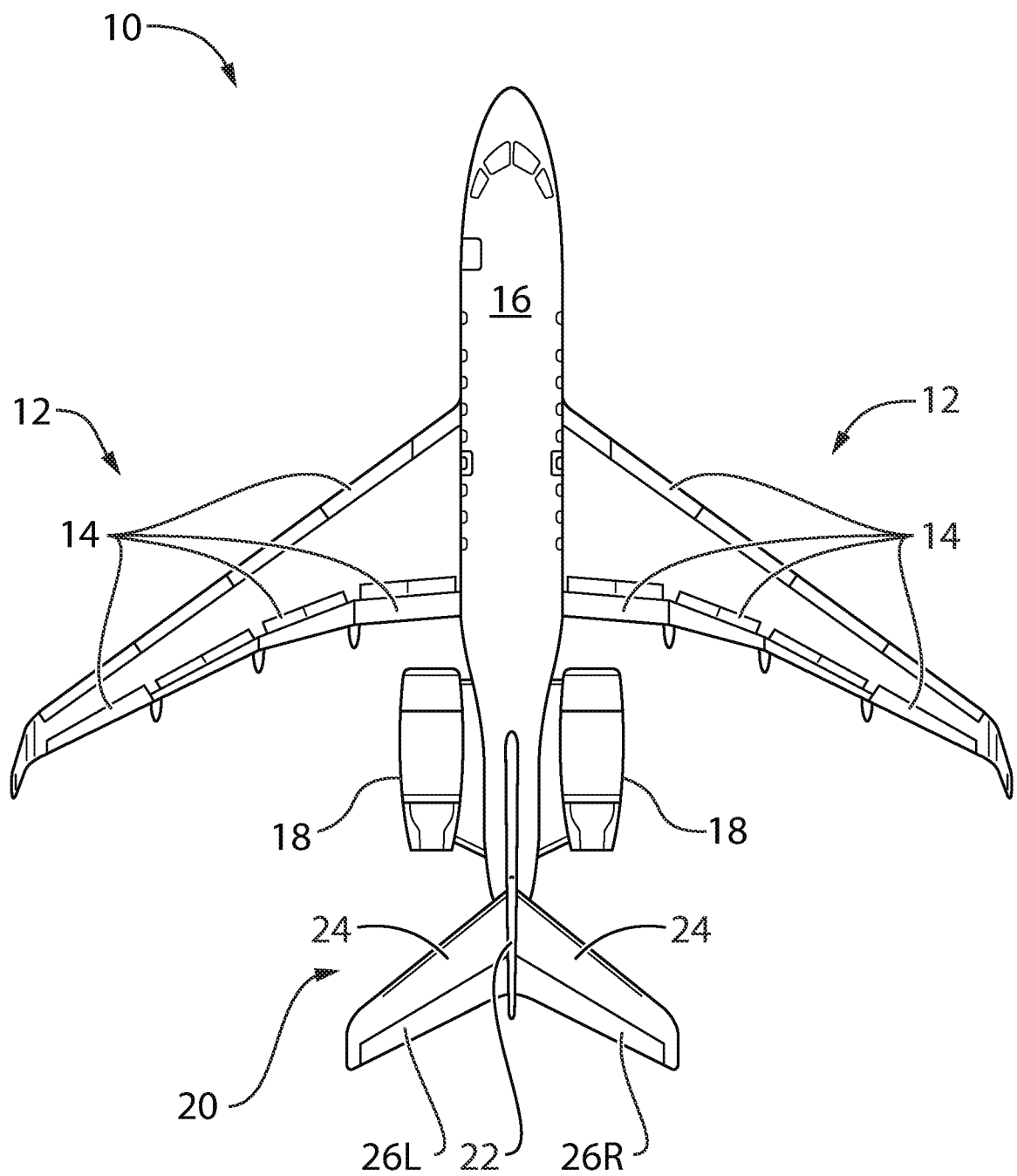
FIG. 1 is a top plan view of an exemplary aircraft comprising a pitch control system as disclosed herein.

FIG. 1 is a top plan view of an exemplary aircraft 10 which may comprise a pitch control system and perform associated methods disclosed herein. Aircraft 10 may be any type of aircraft such as corporate (e.g., business jet), private, commercial and passenger aircraft suitable for civil aviation. For example, aircraft 10 may be a narrow-body, twin-engine jet airliner. Aircraft 10 may be a fixed-wing aircraft.

Aircraft 10 may comprise one or more wings 12 including one or more flight control surfaces 14, fuselage 16, one or more engines 18 and empennage 20 of known or other type.

One or more of engines 18 may be mounted to fuselage 16. Alternatively, or in addition, one or more of engines 18 may be mounted to wings 12.

Empennage 20 may comprise vertical stabilizer 22 to which a movable rudder may be coupled and used to impart a turning or yawing motion to aircraft 10. Empennage 20 may also comprise horizontal stabilizer 24 (referred hereinafter as "stabilizer 24") and one or more elevators 26R and 26L (referred generically as "elevator 26") movably coupled to stabilizer 24. Stabilizer 24, sometimes called "tailplane", may extend substantially symmetrically and laterally from each side of vertical stabilizer 22 where right elevator 26R may be disposed on a right hand side of vertical stabilizer 22 and left elevator 26L may be disposed on a left hand side of vertical stabilizer 22. Stabilizer 24 may be movably coupled to empennage 20 so as to be "trimmable". Stabilizer 24 and elevators 26A and 26B may be independently controllably actuatable and be part of a pitch control system of aircraft 10. It is understood that stabilizer 24 may not necessarily be absolutely horizontal but may instead be at any orientation suitable for providing pitch stability or control.

Figure 2:
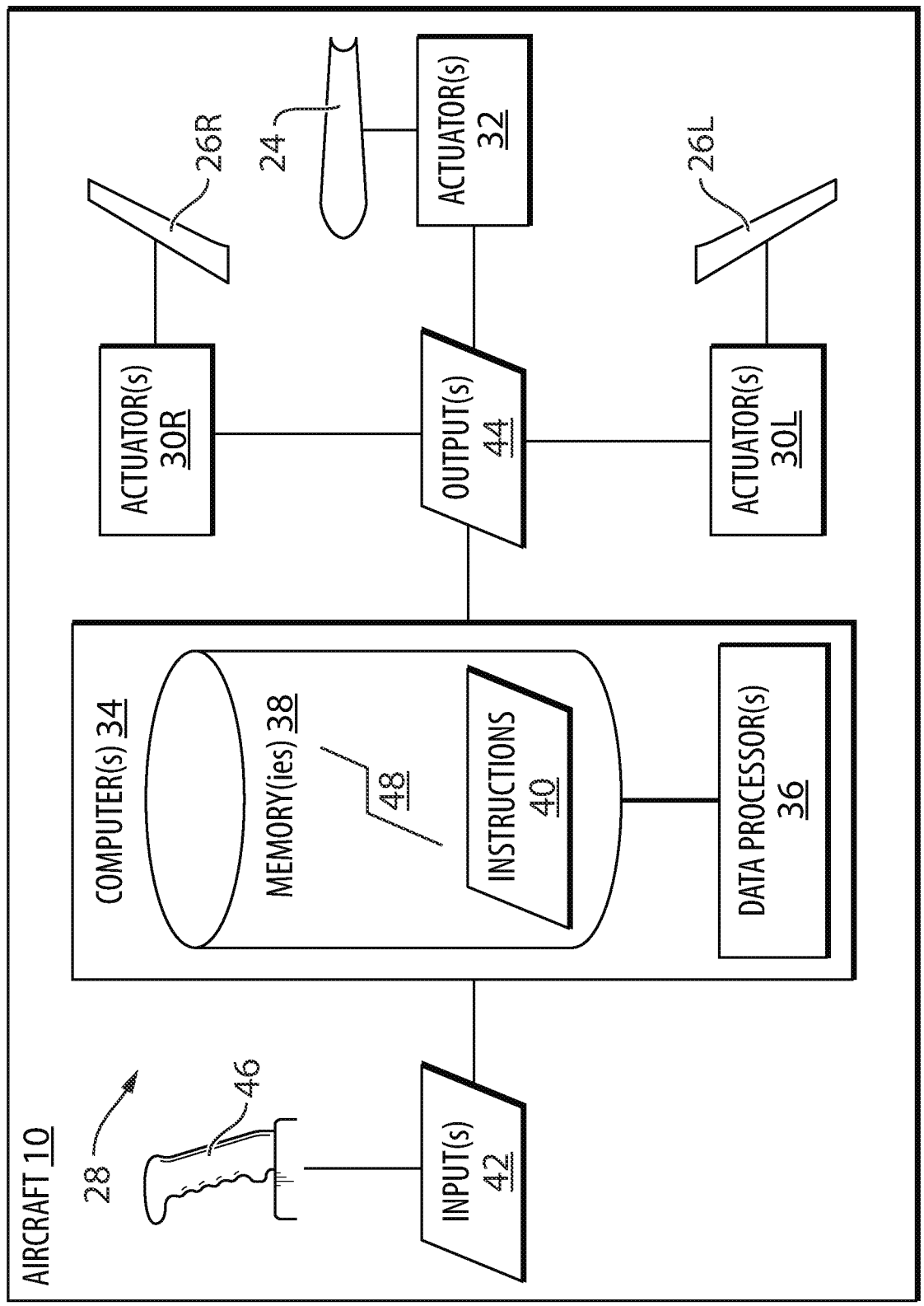
FIG. 2 is a schematic representation of an exemplary pitch control system as disclosed herein.

FIG. 2 is a schematic representation of an exemplary pitch control system 28 of aircraft 10 as disclosed herein. Pitch control system 28 may permit electronic gearing between stabilizer 24 and elevator 26 so that a commanded actuation of stabilizer 24 may automatically result in a corresponding actuation of elevator 26 at least in some range of movement of stabilizer 24. This may increase the effectiveness (e.g., power) of stabilizer 24 during operation (e.g., flight, cruise, take-off) of aircraft 10 compared to a conventional stabilizer of similar size not equipped with a geared elevator. In some embodiments, the use of geared elevator 26 may permit the reduction of the total range of travel of stabilizer 24 and hence reduce the size of the actuation mechanism(s) required for stabilizer 24 compared to stabilizers that have non-geared elevators movably coupled thereto. Accordingly, the use of geared elevator 26 may permit stabilizer 24 to be of reduced cost, size and/or weight compared to a conventional stabilizer of similar performance but not equipped with a geared elevator.

In some embodiments, the effectiveness of stabilizer 24 due to electronic gearing may be increased at least in part due to camber being generated in the horizontal tail (stabilizer 24+elevator 26) in areas of the flight envelope where relatively high (positive or negative) tail lift is required.

The use of electronic gearing between stabilizer 24 and elevator 26 may permit synchronized actuation of stabilizer 24 and elevator 26 where elevator 26 may be actuated as a function of (e.g., in proportion to) stabilizer 24 actuation without the use of mechanical motion transfer means to achieve such synchronized actuation. In other words, stabilizer 24 may be considered a master device and elevator 26 may be considered a slave device where the master device and the slave device are actuated by independently controlled actuators. As the actuation of the slave device follows the actuation of the master device according to a relationship (e.g., constant ratio), the effect achieved may be similar to that of two devices that are mechanically geared. The synchronized actuation of stabilizer 24 and elevator 26 using such electronic gearing may be controlled by suitable (e.g., position) sensing and feedback control methods of known or other types.

Electronic gearing can have advantages over the use of mechanical motion transfer means (e.g., gears, linkages). One notable advantage is flexibility because the gearing relationship (i.e., gear ratio) can be changed without having to redesign/build a mechanical motion transfer means. This can be advantageous during (e.g., flight, wind tunnel) testing of aircraft 10 for example where some adjustments to the gearing relationship may be required. Another advantage is that the nature of the gearing relationship is not dictated by limitations, complexities and weight associated with mechanical motion transfer means.

As shown schematically in FIG. 2, pitch control system 28, may in some embodiments, comprise elevator actuators 30R and 30L (referred generically as "elevator actuator 30") respectively associated with elevators 26R and 26L. In some embodiments of aircraft 10, elevator actuators 30R and 30L may be used to separately actuate right elevator 26R and left elevator 26L. However, in some embodiments, right elevator 26R and left elevator 26L may be actuated together as a unit by one or more common actuators 30. In various embodiments, right elevator 26R and left elevator 26L may be separately actuatable or may be connected together so as to be actuatable as a single flight control surface via one or more actuators 30. Pitch control system 28 may also comprise one or more stabilizer actuators 32 configured to actuate movable stabilizer 24 of aircraft 10.

FIG. 2 shows elevators 26R and 26L as being separate from stabilizer 24 but it is understood that elevators 26R and 26L may be movably coupled (e.g., hinged) to stabilizer 24. Elevator 26 may be actuated/deflected by some amount measured as angular displacement relative to an elevator neutral position. Stabilizer 24 may also be actuated/deflected by some amount measured as angular displacement relative to a stabilizer neutral position.

Pitch control system 28 may be disposed onboard of aircraft 10 and may comprise one or more computers 34 (referred hereinafter in the singular) operatively coupled to elevator actuator 30 and to stabilizer actuator 32. It is understood that computer 34 may be directly or indirectly (e.g., via intermediate device(s)) coupled to elevator actuator 30 and stabilizer actuator 32 so as to impart some control over the operation of elevator actuator 30 and stabilizer actuator 32. Computer 34 may comprise one or more data processors 36 (referred hereinafter in the singular) of known or other type and which may be used to perform methods disclosed herein in entirety or in part. In some embodiments, methods disclosed herein may be performed using a single data processor 36 or, alternatively, parts of the methods disclosed herein could be performed using multiple data processors 36. Computer 34 may comprise machine-readable memory 38 storing instructions 40 executable by data processor 36 and configured to cause data processor 36 to carry out one or more tasks associated with controlling the pitch of aircraft 10 via elevator actuator 30 and stabilizer actuator 32.

For example, computer 34 may receive input(s) 42 in the form of data or information that may be processed by data processor 36 based on instructions 40 in order to generate output 44. For example, input 42 may comprise information (data) representative of a command associated with the pitch of aircraft 10. Input 42 may comprise one or more signals representative of an input received from a pilot of aircraft 10 via input device 46 for example. Input device 46 may be of the type known as "side stick" or "control yoke" typically used by a pilot to input pitch commands. Alternatively, input 42 may be provided by another computer or control system (e.g., auto-flight, auto-trim) of aircraft 10. Alternatively, input 42 could also be produced/derived within computer 34 and subsequently used by data processor 36. Input 42 may be representative of a commanded actuation amount for stabilizer 24.

Computer 34 may be part of an avionics suite of aircraft 10. For example, in some embodiments, computer 34 may carry out additional functions than those described herein. In some embodiments, computer 34 may be of the type known as a primary flight control computer (PFCC) of aircraft 10. In some embodiments, pitch control system 28 may be part of a fly-by-wire control system of known or other type for aircraft 10.

Data processor 36 may comprise any suitable device(s) configured to cause a series of steps to be performed by computer 34 so as to implement a computer-implemented process such that instructions 40, when executed by computer 34, may cause the functions/acts specified in the methods described herein to be executed. Data processor 36 may comprise, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 38 may comprise any suitable known or other machine-readable storage medium. Memory 38 may comprise non-transitory computer readable storage medium such as, for example, but not limited to, an electronic, magnetic, optical, electromagnetic, infrared, or semiconductor system, apparatus, or device, or any suitable combination of the foregoing. Memory 38 may include a suitable combination of any type of computer memory that is located either internally or externally to computer 34. Memory 38 may comprise any storage means (e.g. devices) suitable for retrievably storing machine-readable instructions 40 executable by data processor 36.

Various aspects of the present disclosure nay be embodied as systems, devices, methods and/or computer program products. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more non-transitory computer readable medium(ia) (e.g., memory 38) having computer readable program code (e.g., instructions 40) embodied thereon. The computer program product may, for example, be executed by computer 34 to cause the execution of one or more methods disclosed herein in entirety or in part.

Computer program code for carrying out operations for aspects of the present disclosure in accordance with instructions 40 may be written in any combination of one or more programming languages, including an object oriented programming language such as Java, Smalltalk, C++ or the like and conventional procedural programming languages, such as the "C" programming language or other programming languages. Such, program code may be executed entirely or in part by computer 34 or other data processing device(s). It is understood that, based on the present disclosure, one skilled in the relevant arts could readily write computer program code for implementing the methods disclosed herein.

In various embodiments, instructions 40 may be configured to cause data processor 36 to use data representative of a commanded stabilizer actuation amount (e.g., input 42) and data representative of one or more gearing relationships 48 between stabilizer 24 and elevator 26 to determine a corresponding elevator actuation amount associated with the commanded stabilizer actuation amount. Instructions 40 may further be configured to cause computer 34 to generate an output 44 (e.g., signals, data) for causing actuator 32 to actuate stabilizer 24 according to the commanded stabilizer actuation amount and for causing actuator 30 to actuate elevator 26 according to the corresponding elevator actuation amount.

Figure 3:
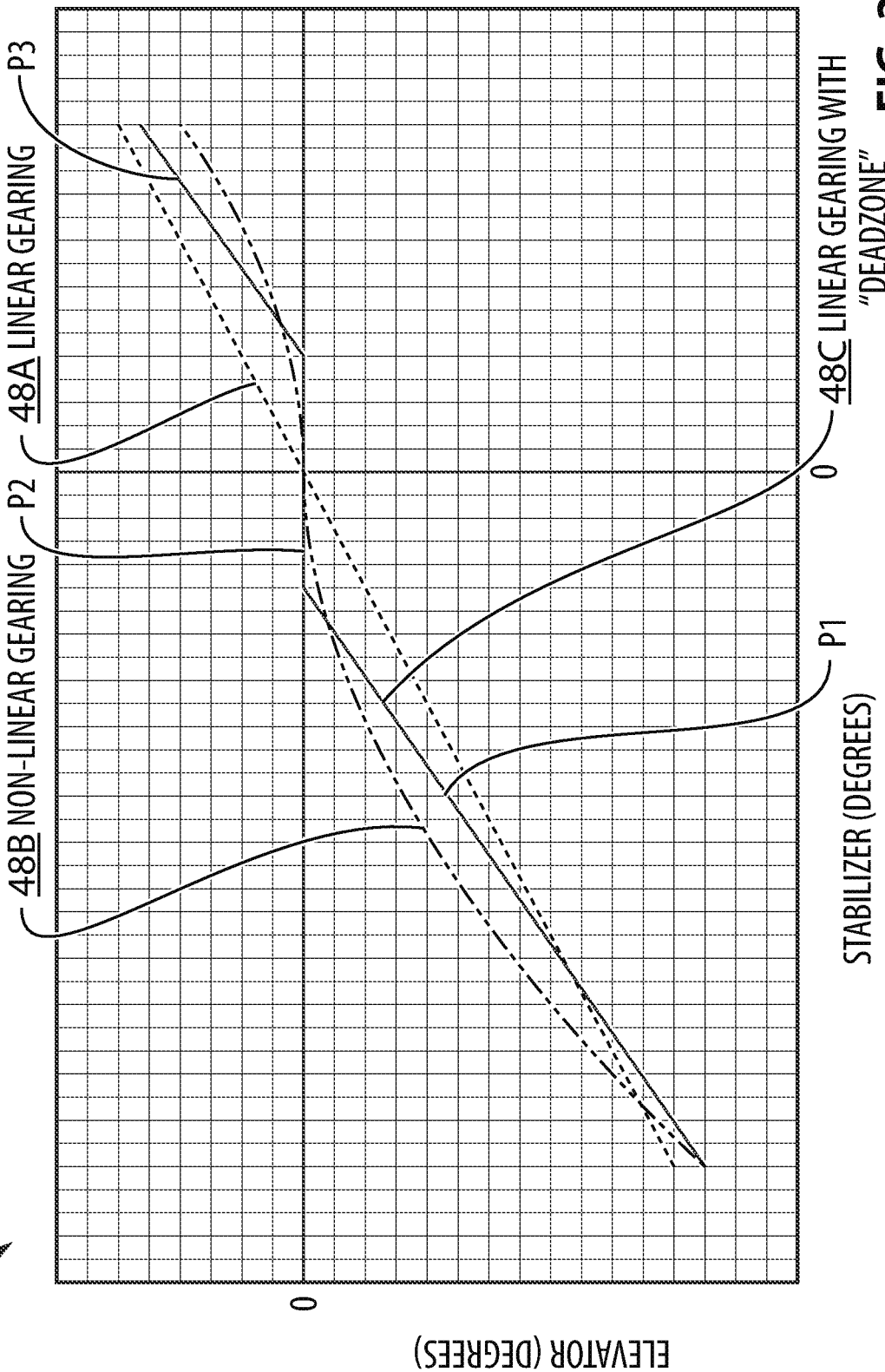
FIG. 3 is a graphical representation of three exemplary gearing relationships for the pitch control system of FIG. 2.

FIG. 3 is a graphical representation of three non-limiting exemplary types of gearing relationships 48A, 48B and 48C (referred generically as "gearing relationship 48") for pitch control system 28. Gearing relationships 48A-48C are plotted as curves on a graph of stabilizer actuation (degrees) versus elevator actuation (degrees) and are superimposed for illustration purposes.

Pitch control system 28 may be configured to permit gearing relationship 48 to be changed based on one or more operating parameters of aircraft 10. Gearing relationship 48 may be changed based on instructions 40 executable by processor 36. For example, the changing of gearing relationship 48 may be achieved by way of pitch control system 28 making use of two or more gearing relationships 48 which may be selected and used at different times depending on the operating condition of aircraft 10. In some embodiments, the desired gearing relationship 48 may be selected by pitch control system 28 based on one or more parameters such as flap angle(s), airspeed and/or Mach number. In some embodiments, gearing relationship(s) 48 may be changed by way of being programmable as a function of one or more parameters such as flap angles, airspeed and/or Mach number.

It is understood that aspects of the present disclosure are not limited to gearing relationships 48A-48C illustrated herein as examples. In various embodiments, gearing relationship 48 may comprise one or more linear portions representative of a constant gear ratio (slope) between stabilizer 24 and elevator 26. Alternatively or in addition, gearing relationship 48 may comprise one or more non-linear portions representative of a variable gear ratio (slope) between stabilizer 24 and elevator 26.

By way of example, gearing relationship 48A may comprise an entirely linear relationship where movement of elevator 26 is proportional to the movement of stabilizer 24 according to a ratio (slope) that is constant over the entire range of motion of stabilizer 24. On the other hand, gearing relationship 48B may comprise an entirely non-linear relationship where movement of elevator 26 is geared to the movement of stabilizer 24 according to a ratio (slope) that varies over the range of motion of stabilizer 24. It is understood that gearing relationship 48 could comprise a combination of one or more linear portions and one or more non-linear portions.

Gearing relationship 48C may comprise a linear relationship with a dead zone around the neutral position (i.e., 0 degrees) of actuation of stabilizer 24. For example, gearing relationship 48C may comprise first portion P1 over a first range of stabilizer actuation amounts in which a first non-zero stabilizer actuation amount requires a corresponding first non-zero elevator actuation amount. Gearing relationship 48C may comprise second portion P2 over a second range of stabilizer actuation amounts in which a second non-zero stabilizer actuation amount requires no elevator actuation amount (i.e., dead zone). Gearing relationship 48C may also comprise third portion P3 over a third range of stabilizer actuation amounts in which a third non-zero stabilizer actuation amount requires a corresponding second non-zero elevator actuation amount. In some embodiments, the second range of stabilizer actuation amounts of second portion P2 may be between the first range of stabilizer actuation amounts of first portion P1 and the third range of stabilizer actuation amounts of the third portion P3.

The second range of stabilizer actuation amounts of second portion P2 (dead zone) may comprise a neutral position of stabilizer 24. The second range of stabilizer actuation amounts may also comprise stabilizer actuation amounts that are near the neutral position and which are typically used for cruise and take-off so that geared actuation of elevator 26 may not be required for one or more phases of flight. For example, having a stabilizer actuation amount that is typically used during cruise within second portion P2 may help lower cruise drag. Gearing relationship 48C may be configured to only make use of geared elevator actuation at larger negative stabilizer settings (e.g., lower than −6°) and for positive stabilizer settings that are greater than +2° for example to assist trimming of stabilizer 24 at a maximum speed (i.e., $V_{FE}$) of aircraft 10 when flaps are extended. Second portion P2 may also make more elevator travel available during phases of flight where stabilizer actuation amounts are within second portion P2.

In some embodiments, at least one of the first portion P1, second portion P2 and third portion P3 of gearing relationship 48C may be linear. In some embodiments, each of the first portion P1, second portion P2 and third portion P3 of gearing relationship 48C may be linear. In some embodiments, at least one of the first portion P1, second portion P2 and third portion P3 of gearing relationship 48C may be non-linear.

In various embodiments, gearing relationship (e.g., 48B and 48C) may comprises a first portion (e.g., P1) over a first range of stabilizer actuation amounts and a second portion (e.g., P2) over a second range of stabilizer actuation amounts where the first portion and the second portion have different slopes.

Figure 4:
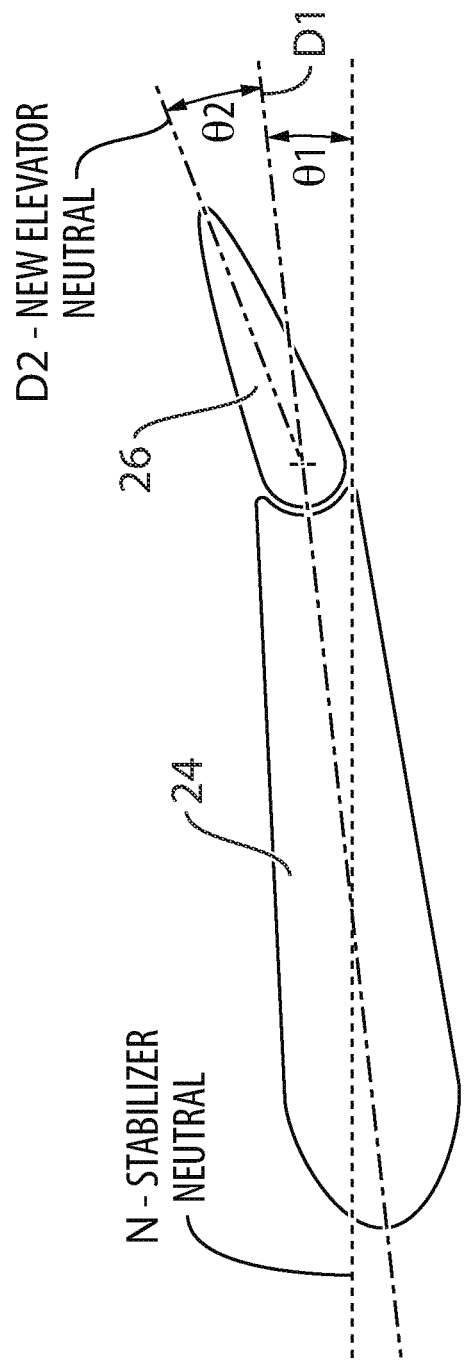
FIG. 4 is a schematic illustration of a horizontal stabilizer and an elevator of the aircraft of FIG. 1 where the horizontal stabilizer is actuated to a position away from its neutral position and the elevator is actuated relative to the horizontal stabilizer according to an exemplary gearing relationship.

FIG. 4 is a schematic illustration of stabilizer 24 and elevator 26 of aircraft 10 of FIG. 1 where stabilizer 24 is actuated to a commanded deflected position represented by line D1 away from its neutral position represented by line N and elevator 26 is actuated relative to stabilizer 24 according to a corresponding deflected position represented by line D2. Line N may be substantially parallel and coincident with a chord of stabilizer 24 when stabilizer 24 is in its neutral position. Line D1 may be substantially parallel and coincident with the chord of stabilizer 24 when stabilizer 24 is in its actuated/deflected position. Line D1 may also be substantially parallel and coincident with a chord of elevator 26 when elevator 26 is in its neutral position relative to stabilizer 24. Line D2 may be substantially parallel and coincident with the chord of elevator 26 when elevator 26 is in its actuated/deflected position that is electronically geared to the actuated/deflected position of stabilizer 24. The actuation amount of stabilizer 24 may be represented by a first angular deflection θ1 (e.g., degrees). The corresponding actuation amount of elevator 26 determined based on gearing relationship 48 may be represented by a second angular deflection θ2 (e.g., degrees) measured relative to line D1.

In various embodiments, gearing relationship 48 may be selected so that the corresponding actuation amount of elevator 26 does not require the entire range of motion of elevator 26. For example, gearing relationship 48 may be configured to allow for further actuation of elevator 26 in either direction beyond or below angle θ2 without overly restricting the remaining travel of elevator 26 in order to maintain satisfactorily maneuverability of aircraft 10. This may still provide a pilot of aircraft 10 the ability to execute pitch commands via input device 46 (see FIG. 2) intended for elevator 26. Accordingly, in some embodiments, the actuation amount of elevator 26 that is due to electronic gearing with stabilizer 24 may be considered as the new neutral position of elevator 26 and serve as a new reference point for further actuation/deflection of elevator 26. Accordingly, in some embodiments of pitch control system 28, instructions 40 may be configured to cause data processor 36 to reset a neutral position of elevator 26 as the corresponding elevator actuation amount (e.g., D2) reached due to electronic gearing relationship 48. In this arrangement, input device 46 could remain in its neutral position even after some geared actuation of elevator 26.

Figure 5:
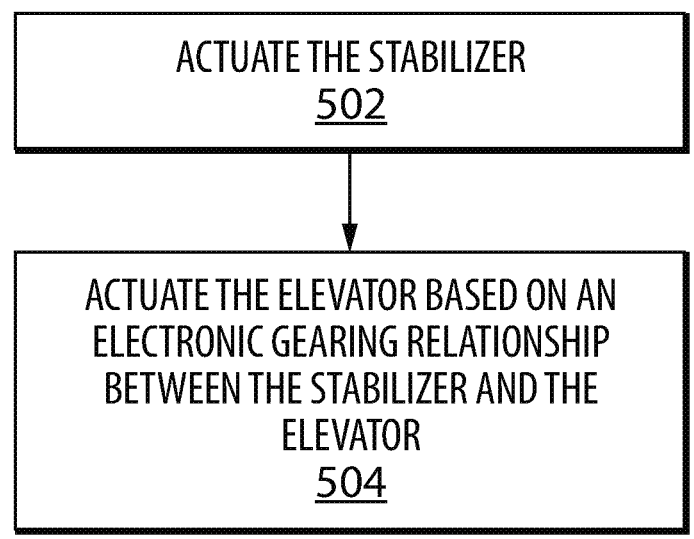
FIG. 5 is a flowchart illustrating a method for controlling the pitch of an aircraft.

FIG. 5 is a flowchart illustrating method 500 for controlling the pitch of aircraft 10 using movable stabilizer 24 and elevator 26 movably coupled to stabilizer 24. In some embodiments, method 500 or part(s) thereof may be performed using pitch control system 28 described above. It is understood that functions described above in relation to pitch control system 28 may be incorporated into method 500. In various embodiments, method 500 may comprise: actuating stabilizer 24 (see block 502); and actuating elevator 26 based on electronic gearing relationship 48 between stabilizer 24 and elevator 26 (see block 504). Although blocks 502 and 504 are shown sequentially, it is understood that actuating stabilizer 24 (block 502) and actuating elevator 26 based on electronic gearing relationship 48 between stabilizer and elevator (block 504) may be implemented simultaneously.

In some embodiments of method 500, and as explained above in relation to pitch control system 28, gearing relationship 48 may comprise first portion P1 over a first range of stabilizer actuation amounts in which a first non-zero stabilizer actuation amount requires a corresponding first non-zero elevator actuation amount; and second portion P2 (i.e., dead zone) over a second range of stabilizer actuation amounts in which a second non-zero stabilizer actuation amount requires no elevator actuation amount. In some embodiments, the second range of stabilizer actuation amounts of second portion P2 comprises a neutral position of stabilizer 24. In some embodiments, the gearing relationship comprises third portion P3 over a third range of stabilizer actuation amounts in which a third non-zero stabilizer actuation amount requires a corresponding second non-zero elevator actuation amount. The second range of stabilizer actuation amounts may be between the first range of stabilizer actuation amounts and the third range of stabilizer actuation amounts. In some embodiments, at least one of first portion P1, second portion P2 and third portion P3 of gearing relationship 48 may be linear. In some embodiments, each of first portion P1, second portion P2 and third portion P3 of gearing relationship 48 may be linear.

In various embodiments of method 500, gearing relationship 48 may comprise a first portion over a first range of stabilizer actuation amounts and a second portion over a second range of stabilizer actuation amounts where the first portion and the second portion have different slopes as illustrated in FIG. 3 by gearing relationships 48B and 48C. In some embodiments, gearing relationship 48 may comprise a linear portion. In some embodiments, gearing relationship 48 may comprise a non-linear portion.

In some embodiments, method 500 may comprise resetting a neutral position of the elevator to an elevator actuation amount attributed to electronic gearing relationship 48.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, blocks may be added, deleted, or modified. The present disclosure may be embodied in other specific forms without departing from the subject matter of the claims. Also, one skilled in the relevant arts will appreciate that while the systems and methods disclosed and shown herein may comprise a specific number of elements/components, the systems and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft pitch control system comprising:
a movable horizontal stabilizer;
a first actuator for actuating the horizontal stabilizer;
an elevator movably coupled to the horizontal stabilizer;
a second actuator for actuating the elevator; and
a computer configured to control the second actuator using an electronic gearing relationship between the horizontal stabilizer and the elevator to cause the elevator to be electronically geared to the horizontal stabilizer, wherein:
the electronic gearing relationship is changeable based on one or more operating parameters of the aircraft, the one or more operating parameters of the aircraft including a flap angle;
the electronic gearing relationship comprises:
a first portion over a first range of stabilizer actuation amounts in which a first stabilizer actuation amount requires a corresponding first elevator actuation amount that is smaller than the first stabilizer actuation amount;
a second portion defining a dead zone over a non-zero second range of stabilizer actuation amounts in which a non-zero second stabilizer actuation amount requires no corresponding second elevator actuation amount; and
a third portion over a third range of stabilizer actuation amounts in which a third stabilizer actuation amount requires a corresponding third elevator actuation amount; and
at least one of the first portion and third portion of the gearing relationship is linear.

2. The system as defined in claim 1, wherein the second range of stabilizer actuation amounts of the second portion comprises a neutral position of the stabilizer.

3. The system as defined in claim 1, wherein the second range of stabilizer actuation amounts is between the first range of stabilizer actuation amounts and the third range of stabilizer actuation amounts.

4. The system as defined in claim 1, wherein each of the first portion and third portion of the gearing relationship is linear.

5. The system as defined in claim 1, wherein the electronic gearing relationship comprises a non-linear portion.

6. An aircraft comprising the aircraft pitch control system as defined in claim 1.

7. The system as defined in claim 1, wherein the first portion of the gearing relationship is changeable to be linear and to define a ratio of the first elevator actuation amount to the first stabilizer actuation amount equal to 0.5.

8. The system as defined in claim 1, wherein the third elevator actuation amount is smaller than the third stabilizer actuation amount.

* * * * *